United States Patent [19]

Kobayashi et al.

[11] Patent Number: 4,627,804

[45] Date of Patent: Dec. 9, 1986

[54] SHEET FORMING APPARATUS

[75] Inventors: Yoshio Kobayashi; Kuniharu Tobita; Kazuo Kishimoto, all of Nagoya, Japan

[73] Assignee: Mitsubishi Jukogyo Kabushiki Kaisha, Tokyo, Japan

[21] Appl. No.: 840,478

[22] Filed: Mar. 14, 1986

Related U.S. Application Data

[63] Continuation of Ser. No. 640,598, Aug. 14, 1984, abandoned.

[51] Int. Cl.$^4$ ............................................. B29B 7/82
[52] U.S. Cl. ........................................ 425/71; 425/69; 425/224; 264/178 R; 264/212
[58] Field of Search ............... 425/224, 71, 69, 367; 264/216, 175, 178 R, 178 F, 212, 169

[56] References Cited

U.S. PATENT DOCUMENTS

| | | | |
|---|---|---|---|
| 2,330,282 | 9/1943 | Hazeltine et al. | 425/224 |
| 4,107,938 | 8/1978 | Sollich | 425/224 |

FOREIGN PATENT DOCUMENTS

| | | | |
|---|---|---|---|
| 0068714 | 1/1983 | European Pat. Off. | 264/178 R |
| 46-25265 | 7/1971 | Japan | 264/216 |
| 47-39929 | 10/1972 | Japan | 264/216 |
| 57-98322 | 6/1982 | Japan | 264/178 R |
| 1214395 | 12/1970 | United Kingdom | 264/216 |

Primary Examiner—Tim Miles
Attorney, Agent, or Firm—Wenderoth, Lind & Ponack

[57] ABSTRACT

An apparatus for forming double-side polished sheet of thermoplastic resin has a first cooling roll for forming a sheet of thermoplastic synthetic resin thereon along a contact angle $\Theta_1$, a second cooling roll having a smaller diameter than the first cooling roll and mounted adjacent the first cooling roll for engaging the outer surface of the sheet formed on the first cooling roll and nipping the sheet between the cooling rolls for receiving the sheet from the first cooling roll onto a part of the surface thereof along a contact angle $\Theta_2$, the second cooling roll being movable along the outer circumference of the first cooling roll for varying the contact angles while continuing to nip the sheet between the cooling rolls, a water tank having at least one guide roller therein and positioned for receiving the sheet directly from the second cooling roll and guiding the sheet from the second cooling roll directly into the water tank, and a water level control in the water tank for varying the water level in accordance with the contact angles for making the distance from the point at which the sheet leaves the second cooling roll to the water level such that the surface temperature of the sheet is below the melting point of the resin when the sheet reaches the water.

2 Claims, 5 Drawing Figures

SHEET FORMING APPARATUS

This application is a continuation of now abandoned application Ser. No. 640,598, filed Aug. 14, 1984, now abandoned.

BACKGROUND OF THE INVENTION AND PRIOR ART

The present invention relates to a sheet forming apparatus which is applicable to a biaxially stretching film manufacturing system, a sheet manufacturing system, etc.

One example of the sheet forming apparatus of the prior art is illustrated in a cross-section side view in FIG. 1, and temperature distributions on or in the sheet being processed in the apparatus shown in FIG. 1 are illustrated in FIG. 2. In FIG. 1, reference numeral 1 designates an extrusion die which extrudes thermoplastic resin in a sheet shape, and an extruded wheet 3 is cooled by blowing pressurized air from an air knife 2 onto the sheet 3. Reference numeral 4 designates a first cooling roll, which is rotatably supported on a shaft extending from side plates (not shown) and which serves to uniformly cool the sheet 3 by feeding a water coolant to its interior.

Reference numeral 5 designates a second cooling roll having a similar structure to the first cooling roll 4, and the first cooling roll 4 and the second cooling roll 5 jointly nip the sheet 3 at a point a to effect double-side polishing of the sheet 3, and subsequently, the sheet 3 is successively cooled while passing around a third cooling roll 6 and a cooling drum 8 within a water tank 7. It is to be noted that the second cooling roll 5 and the third cooling roll 6 are movable in directions b and in directions c, respectively.

In addition, reference numeral 9 designates a dewatering device, which is constructured of air nozzles for blowing away moisture from a wet sheet 3 coming out of the water tank 7, and the like. Reference numeral 10 designates a drawing roll, which draws up the sheet 3 by nipping it between a nip roll 11 and the drawing roll 10 to feed the sheet 3 to an apparatus in a subsequent step such as, for example, a width expanding machine. Also, the nip roll 11 is movable in directions d.

However, in the apparatus shown in FIG. 1, if the yield, that is, the conveying speed of the sheet 3 extruded from the die 1, is varied or the thickness of the sheet 3 is varied, then because the temperature of the sheet 3 at the point a which is the nip point between the first cooling roll 4 and the second cooling roll 5 will also differ correspondingly, it is necessary to regulate the cooling capacities of the first cooling roll 4 and the second cooling roll 5 in accordance with the difference in the sheet temperature. However, in some cases the regulation of the cooling capacities of the first cooling roll 4 and the second cooling roll 5 cannot be carried out sufficiently to maintain a sheet temperature at which double-side polishing can be achieved.

According to our measurement of the temperature distributions along one principal surface A, the opposite principal surface B and a center C of the thickness of the sheet 3, as shown in FIG. 2 the surface A is at first quickly cooled by the first cooling roll 4 (time interval I), but as the sheet 3 is transferred onto the second cooling roll 5 the surface A abruptly rises in temperature and remelts (time interval II), and sometimes glaze formed on the surface A by the first cooling roll 4 may disappear and creases may be generated on the surface A.

Thereafter, the surface A is successively cooled while being subjected to lowering of its temperature by the third cooling roll 6 (time interval III), raising of the temperature during the period before making contact with the cooling drum 8 (time interval IV) and lower of the temperature within the water tank 7 (time interval V).

Also with regard to the surface B, a remelting phenomenon similar to that occurring on the surface A will appear when the sheet 3 moves from the second cooling roll 5 to the third cooling roll 6, that is, in the time interval III. Therefore, the prior art apparatus has the shortcomings that not only is the time required before the temperatures on the surfaces A and B and at the center C become approximately equal to each other, but also the cost is high because the third cooling roll 6 is provided besides the first cooling roll 4 and the second cooling roll 5.

OBJECTS AND BRIEF DESCRIPTION OF THE INVENTION

It is therefore one object of the present invention to provide a sheet forming apparatus which is free from the above-described shortcomings of the sheet forming apparatus in the prior art.

Another object of the present invention is to provide a sheet forming apparatus which can easily form a double-side polished sheet at a low cost.

A more specific object of the present invention is to provide an apparatus for forming a double-side polished sheet of thermoplastic synthetic resin in which the temperatures on the respective surfaces and at the center of the thickness of a sheet extruded from an extrusion die can be quickly cooled to an equilibrium temperature distribution.

According to one feature of the present invention, there is provided an apparatus for forming a double-side polished sheet of thermoplastic synthetic resin, in which a second cooling roll having a smaller diameter than a first cooling roll is disposed so as to be movable along the outer circumference of the first cooling roll, there is provided a guide roller for guiding a sheet which has left the second cooling roll directly into a water tank, and the water level in the water tank is made variable.

The above-described and other features and objects of the present invention will become apparent by reference to the following description of a preferred embodiment of the invention taken in conjunction with the accompanying drawings, wherein:

DETAILED DESCRIPTION OF THE INVENTION

Figure 3:
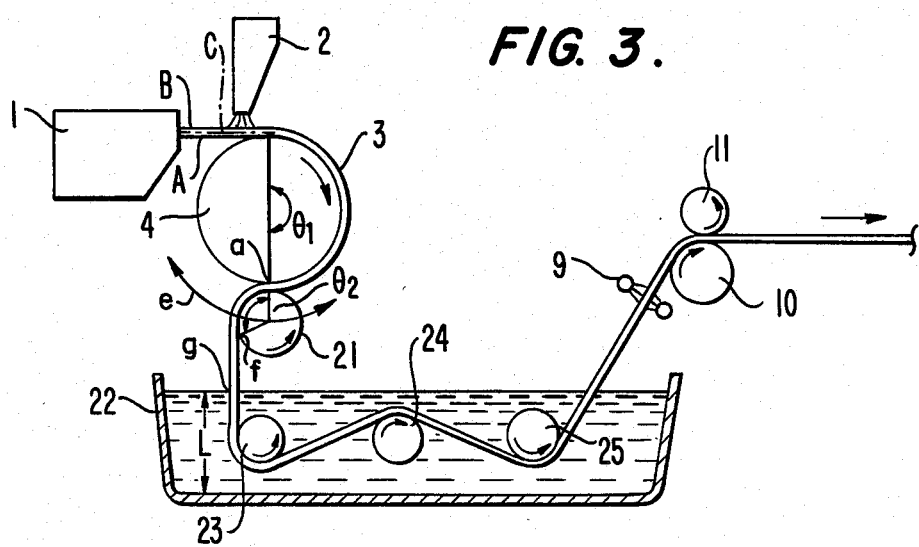
FIG. 3 is a cross-section side view of a sheet forming apparatus according to one preferred embodiment of the present invention.
Figure 4:
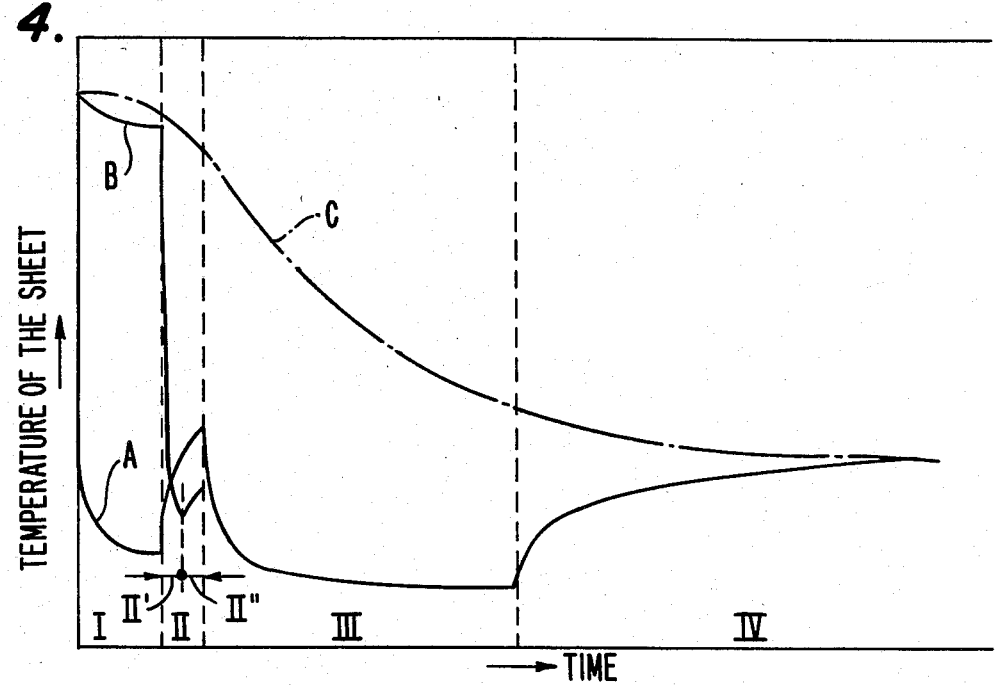
FIG. 4 is a diagram showing temperature distributions on and in a sheet being processed in the apparatus shown in FIG. 3.
Figure 5:
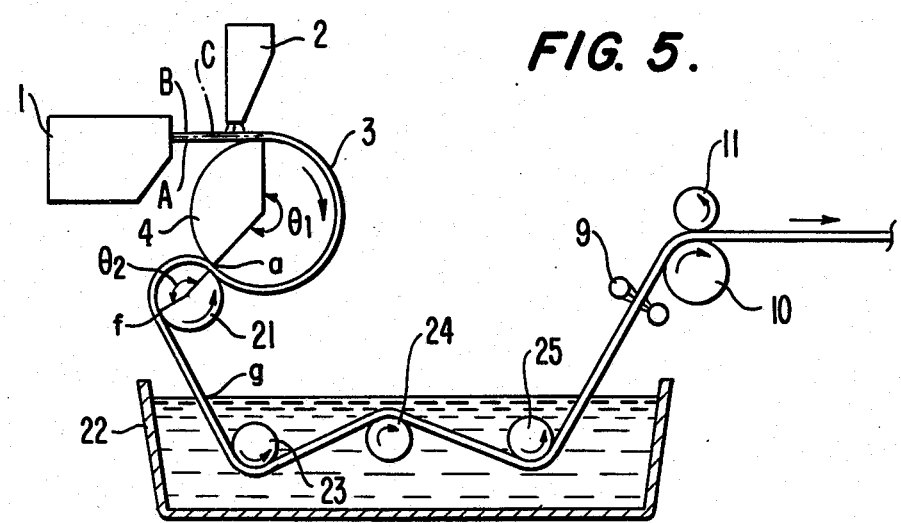
FIG. 5 is a cross-section side view of the same sheet forming apparatus but in a different operating condition.

Referring now to FIGS. 3 to 5 of the drawings, reference numeral 21 designates a second cooling roll, which is rotatably supported on a shaft not shown above a water tank 22 and nips a sheet 3 at a point a in cooperation with a first cooling roll 4 to perform double-side polishing of the sheet 3. The second cooling roll 21 has a smaller outer diameter than that of the first cooling roll 4 is mounted on the shaft therefor so as to be movable in the directions indicated by arrows e along the outer circumference of the first cooling roll 4 by known driving means, whereby the contact angles $\Theta_1$ and $\Theta_2$ of the sheet 3 on the cooling rolls 4 and 21, respectively, are variable.

Figure 1:
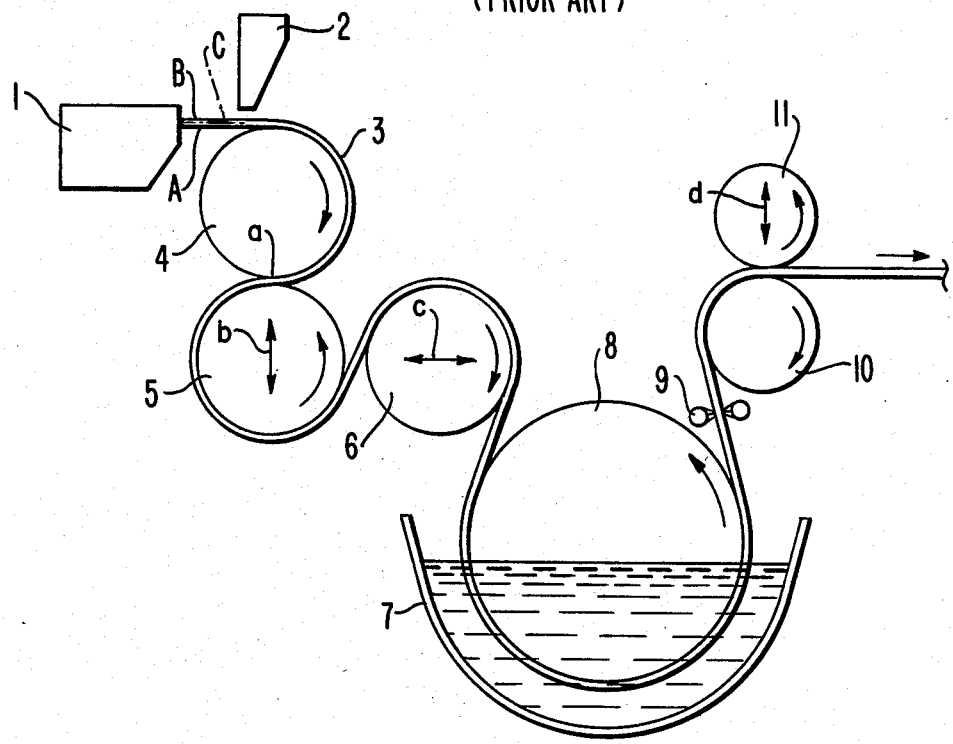
FIG. 1 is a cross-section side view of a sheet forming apparatus of the prior art.
Figure 2:
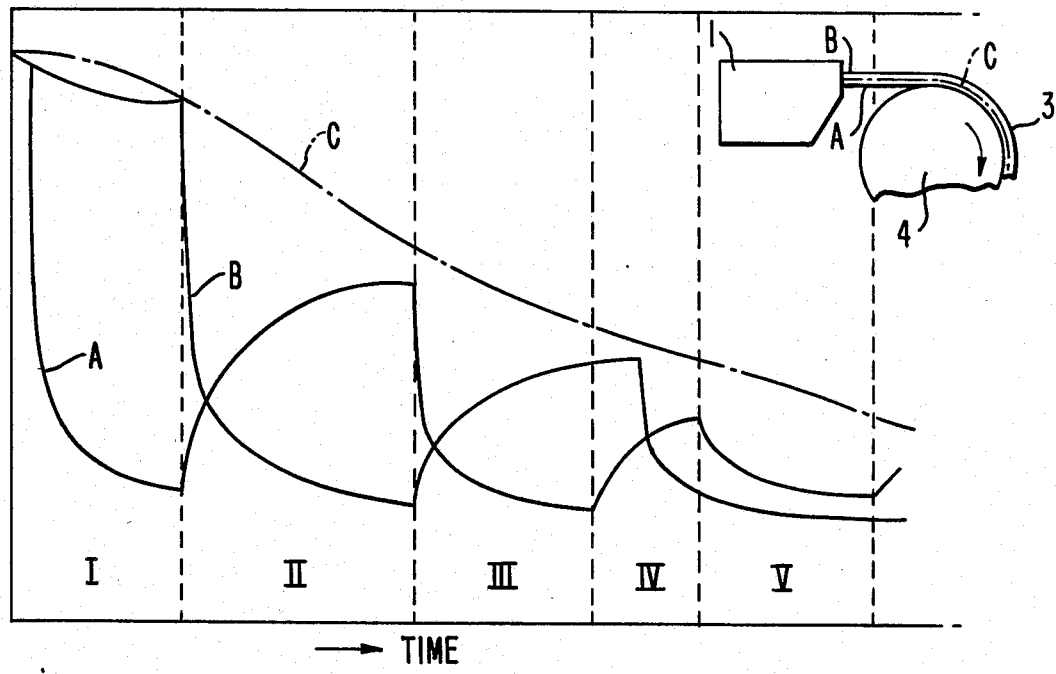
FIG. 2 is a diagram showing temperature distributions on and in a sheet being processed in the apparatus shown in FIG. 1.

Reference numeral 22 designates a water tank, in which are rotatably supported guide rolls 23, 24 and 25 on pivot shafts, and in which the level L of the water surface is variable. While a description has been given of the differences of the apparatus shown in FIGS. 3 and 5 from that shown in FIG. 1, the die 1, air knife 2, dewatering device 9, drawing roll 10 and nip roll 11 are identical in construction and operations to those in the apparatus shown in FIG. 1, and therefore, a detailed description thereof will be omitted.

Explaining now the operation of the apparatus shown in FIGS. 3 and 5, a sheet 3 extruded from the extrusion die 1 has its surfaces A and B cooled during its movement from the first cooling roll 4 via the nip point a to the second cooling roll 21, and thereby the both surfaces A and B are subjected to polishing. During this period, as shown in FIG. 4, the surface A is quickly cooled by the first cooling roll 4 (time interval I), and after the sheet 3 has been transferred onto the second cooling roll 21 via the nip point a, the temperature of surface A is raised until the sheet 3 is immersed in the water tank 22 (time interval II).

After the sheet 3 has been immersed in the water tank 22, the temperature of surface A is quickly lowered, and the temperature fall continues while the sheet 3 is moving within the water tank 22 while being guided by the guide rolls 23, 24 and 25 (time interval III). Subsequently, after the sheet 3 has come out of the water tank 22, the temperature of the surface A rises again, but is approximates the temperature at the center C of the thickness of the sheet 3 (time interval IV).

On the other hand, the temperature of surface B is quickly lowered after the sheet 3 has passed the nip point a, and the temperature fall continues during the period before the sheet 3 leaves the second cooling roll 21 at the point f (time interval II'). Then, the temperature of surface B is raised during the period after the sheet 3 has left the second cooling roll 21 and before it is immersed in the water tank 22 (time interval II''). After the sheet 3 has been immersed in the water tank 22, the temperature of surface B is quickly lowered and reaches a temperature similar to the temperature of the surface A, and thereafter the surface B follows the same temperature variation as the surface A (time interval III and IV).

Here is is to be noted that it is necessary to limit the surface temperature of the sheet 3, which leaves the second cooling roll 21 at the point f and enters the water tank 22 at the point g, normally to lower than 180° C. This is because if the surface temperature of the sheet 3 at the point f should exceed 180° C., there would be a fear that coolant water in the proximity of the point g may boil and a pockmark-like pattern may be generated on the surfaces of the sheet 3.

In the illustrated embodiment, the above-described contact angle $\Theta_1$ is selected to be an angle appropriate for cooling the sheet 3 and obtaining a double-side polished sheet. Assuming that the extruding rate is kept constant, then as the thickness of the sheet is increased, the angle $\Theta_1$ tends to be enlarged. The contact angle $\Theta_2$ is varied in accordance with the variation of the contact angle $\Theta_1$, and when the angle $\Theta_1$ is large, the contact angle $\Theta_2$ also becomes large.

On the other hand, it is necessary to guide the sheet 3 into the water tank 22 while maintaining the surface temperature of the sheet 3 which has left the second cooling roll 21, at or below a temperature at which the sheet 3 will not, remelt and creases will not be generated on the surface of the sheet 3, and thereby prevent rise of the surface temperature of the sheet 3. For instance, if the second cooling roll 21 in FIG. 3 is moved in the direction indicated by the leftward arrow e to the position shown in FIG. 5, then the distance along the sheet 3 from the point a to the point g is increased. Therefore, in order to minimize the distance along the sheet 3 from the point a to the point g, in this case the increase of the distance is compensated for by raising the level L of the water surface in the water tank 22 (See the cooling curve for the surface A in the time interval II in FIG. 4.).

Since the present invention has the features as described in detail above, according to the present invention it becomes possible to limit the surface temperature of the sheet 3 at the point g to lower than 180° C. and regulate the cooling capacities of the first and second cooling rolls by moving the second cooling roll 21 along the outer circumference of the first cooling roll 4 to vary the respective contact angles $\Theta_1$ and $\Theta_2$ as shown in FIG. 5 and also by suppressing the temperature rise at the surfaces of the sheet 3 through regulation of the water level L, and further, the time required before the temperatures on the surfaces A and B and at the center C become approximately the same as each other can be reduced, so that a double-side polished sheet can be easily formed.

In addition, owing to the fact that the contact angle $\Theta_1$ of the sheet 3 for the first cooling roll 4 can be increased by moving the second cooling roll 21 to the left of the first cooling roll 4 as shown in FIG. 5, it becomes possible to reduce the roll diameter of the first cooling roll 4, and hence reduction of the cost of the apparatus can be achieved. Moreover, since the second cooling roll has a smaller diameter than the first cooling roll, the distance along the sheet between the point where the sheet leaves the second cooling roll and the point where the sheet enters the water tank, can be shortened, and hence the repeated rise of the surface temperature of the sheet can be made small. Furthermore, as the path length between the rolls under the unstable condition where the sheet has not been perfectly solidified can be shortened, stable shaping of the sheet can be achieved. In one modification, the second cooling roll 21, water tank 22 and guide rolls 23, 24 and 25 could be constructed in an integral structure and they could be made movable as a whole along the outer circumference of the first cooling roll 4.

While the principle of the present invention has been described above in connection to one preferred embodiment of the invention, it is to be understood that many changes and modifications can be made to the above-described structure without departing from the spirit of the present invention.

What is claimed is:

1. An apparatus for forming double-side polished sheet of thermoplastic resin, comprising:
   a first cooling roll;
   means for forming a sheet of thermoplastic synthetic resin on said first cooling roll along a contact angle $\Theta_1$;
   a second cooling roll having a smaller diameter than said first cooling roll and mounted adjacent said first cooling roll for engaging the outer surface of the sheet formed on said first cooling roll and nipping the sheet between said cooling rolls for receiving the sheet from said first cooling roll onto a part of the surface thereof along a contact angle $\Theta_2$;
   mounting means on which said second cooling roll is mounted for being movable along the outer circumference of said first cooling roll for varying said contact angles while continuing to nip the sheet between said cooling rolls;
   a water tank having at least one guide roller therein and positioned for receiving the sheet directly from said second cooling roll and guiding the sheet from said second cooling roll directly into said water tank; and
   means for varying the water level in said water tank in accordance with said contact angles for making the distance from the point at which the sheet leaves said second cooling roll to the water level is such that the surfae temperature of the sheet is below the melting point of the resin when the sheet reaches the water.

2. An apparatus as claimed in claim 1 in which said means for varying the water level comprises means for raising the water level when said second cooling roll is moved around said first cooling roll to increase the distance from said second cooling roll to said guide roller.

* * * * *